United States Patent
Schwartz

(10) Patent No.: US 10,126,870 B2
(45) Date of Patent: Nov. 13, 2018

(54) TECHNIQUES FOR MITIGATING NOISE IN CAPACITIVE SENSING DEVICES

(71) Applicant: Synaptics Incorporated, San Jose, CA (US)

(72) Inventor: Adam Schwartz, Redwood City, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 110 days.

(21) Appl. No.: 14/502,870

(22) Filed: Sep. 30, 2014

(65) Prior Publication Data

US 2015/0346862 A1 Dec. 3, 2015

Related U.S. Application Data

(60) Provisional application No. 62/007,257, filed on Jun. 3, 2014.

(51) Int. Cl.
G06F 3/044 (2006.01)
G06F 3/041 (2006.01)

(52) U.S. Cl.
CPC .................. *G06F 3/0418* (2013.01)

(58) Field of Classification Search
None
See application file for complete search history.

(56) References Cited

U.S. PATENT DOCUMENTS

| | | | |
|---|---|---|---|
| 7,031,886 B1 | 4/2006 | Hargreaves | |
| 7,863,828 B2* | 1/2011 | Melanson | H02M 1/4225 315/247 |
| 8,352,202 B2 | 1/2013 | Hargreaves | |
| 8,466,885 B2 | 6/2013 | Newton | |
| 8,508,493 B2 | 8/2013 | Souchkov | |
| 9,256,330 B2* | 2/2016 | Joharapurkar | G06F 3/044 |
| 9,304,623 B2* | 4/2016 | King-Smith | G06F 3/03545 |
| 2005/0146513 A1 | 7/2005 | Hill et al. | |
| 2005/0190162 A1 | 9/2005 | Newton | |
| 2011/0061947 A1* | 3/2011 | Krah | G06F 1/3215 178/18.01 |
| 2012/0043140 A1* | 2/2012 | Peterson | G06F 3/0416 178/18.06 |
| 2012/0182229 A1 | 7/2012 | Shepelev et al. | |
| 2012/0212851 A1 | 8/2012 | Goldberg et al. | |
| 2013/0176273 A1* | 7/2013 | Li | G06F 3/044 345/174 |
| 2014/0204058 A1* | 7/2014 | Huang | G06F 3/0418 345/174 |
| 2015/0180493 A1* | 6/2015 | Liu | H02M 3/06 324/686 |

(Continued)

*Primary Examiner* — Joseph Haley
*Assistant Examiner* — Emily Frank
(74) *Attorney, Agent, or Firm* — Paradice and Li LLP

(57) ABSTRACT

Disclosed herein are techniques for reducing certain types of noise in capacitive sensing devices. The techniques generally comprise utilizing a low-pass filter in conjunction with a comb filter to "zero out" frequency components associated with certain types of noise. More specifically, the comb filter is configured to zero out noise associated with the fundamental frequency and harmonics of noise that approximates a square wave or an impulse train. The frequency of the sensing signal for capacitive sensing is chosen such that the comb filter does not zero out such frequency.

19 Claims, 12 Drawing Sheets

(56) References Cited

U.S. PATENT DOCUMENTS

2015/0268760 A1* 9/2015 Park .................... G06F 3/044
            345/174
2015/0293621 A1* 10/2015 Singh ................... G06F 3/044
            345/173

* cited by examiner

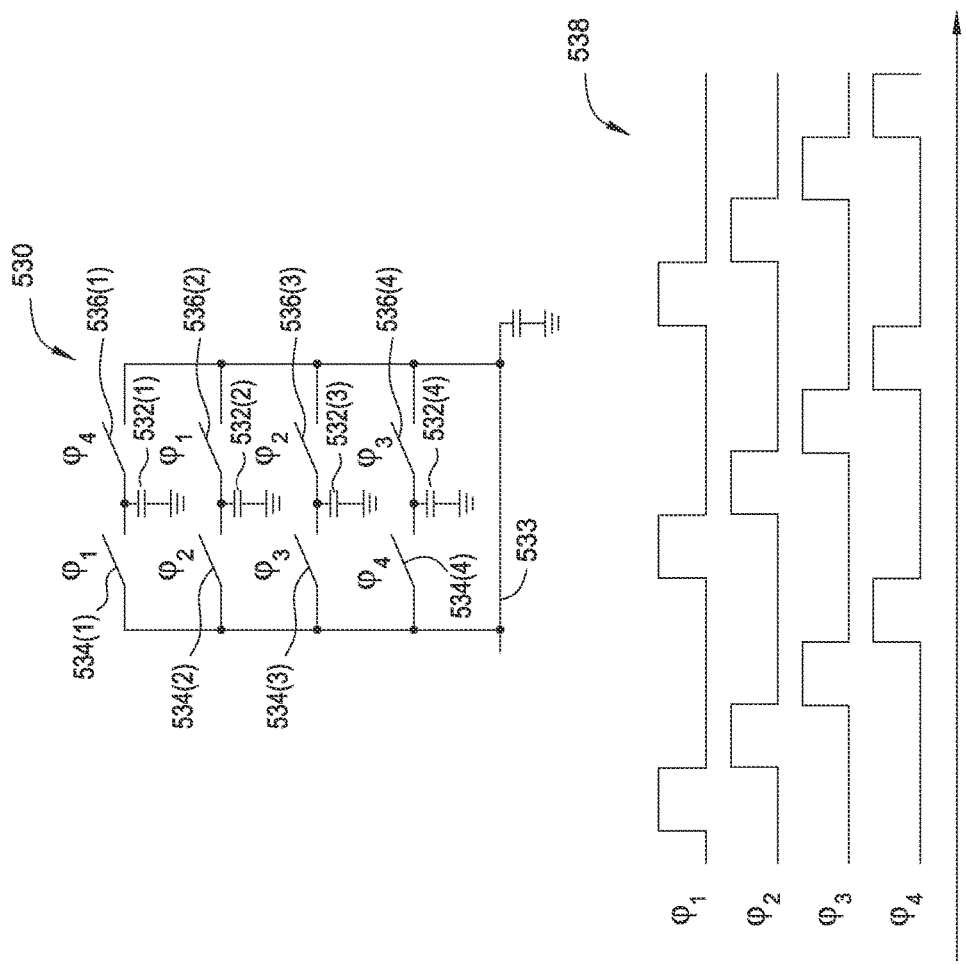

TECHNIQUES FOR MITIGATING NOISE IN CAPACITIVE SENSING DEVICES

CROSS-REFERENCE TO RELATED APPLICATIONS

This application claims the priority benefit of U.S. provisional patent application Ser. No. 62/007,257, filed Jun. 3, 2014 and titled, "Input Device Employing a Comb Filter." The subject matter of this related application is hereby incorporated herein by reference.

BACKGROUND

Technical Field

Embodiments of the present invention generally relate to a method and apparatus for capacitive sensing, and more specifically, to techniques for mitigating noise in capacitive sensing devices.

Description of the Related Art

Input devices including proximity sensor devices (also commonly called touchpads or touch sensor devices) are widely used in a variety of electronic systems. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Environmental noise may affect the signals received while operating a proximity sensor device for capacitive sensing. More specifically, various noise signals, such as ambient signals or signals generated by various elements of the proximity sensor device, may affect signals received during capacitive sensing. These noise signals may cause the proximity sensor device to incorrectly identify the presence of one or more input objects.

As the foregoing illustrates, what is needed in the art are techniques and apparatus for reducing the impact of noise on proximity sensor devices.

SUMMARY

One example disclosed herein includes a processing system for a capacitive sensing device. The processing system includes a sensor module. The sensor module includes a receiver configured to output a first intermediate signal, the first intermediate signal based on a resulting signal received with a sensor electrode. The sensor module also includes a first filter configured to receive the first intermediate signal and to remove interference having a first frequency from the first intermediate signal to output a second intermediate signal. The sensor module further includes a second filter configured to process the second intermediate signal to remove interference having a second frequency from the second intermediate signal to output an output signal. The processing system also includes a determination module configured to determine positional information of an input object based on the output signal.

Another example disclosed herein includes a sensor module. The sensor module includes a receiver configured to output a first intermediate signal, the first intermediate signal based on a resulting signal received with a sensor electrode. The sensor module also includes a first filter configured to receive the first intermediate signal and to remove interference having a first frequency from the first intermediate signal to output a second intermediate signal. The sensor module further includes a second filter configured to process the second intermediate signal to remove interference having a second frequency from the second intermediate signal to output an output signal. The second filter is coupled to a determination module configured to determine positional information of an input object based on the output signal.

Another example disclosed herein includes an input device. The input device includes a plurality of sensor electrodes configured for capacitive sensing. The input device also includes a processing system coupled to the plurality of sensor electrodes. The processing system is configured to receive a resulting signal with a first sensor electrode of the plurality of sensor electrodes and output a first intermediate signal based on the resulting signal. The processing system is also configured to filter the first intermediate signal using a first filter to remove interference having a first frequency from the first intermediate signal to generate a second intermediate signal. The processing system is further configured to filter the second intermediate signal using a second filter to remove interference having a second frequency from the second intermediate signal to generate an output signal. The processing system is further configured to determine positional information for an input object in a sensing region of the input device based on the output signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5D illustrates a circuit-level example of a comb filter for use in the filter module of FIG. 5A, according to one example disclosed herein.

Figure 1:
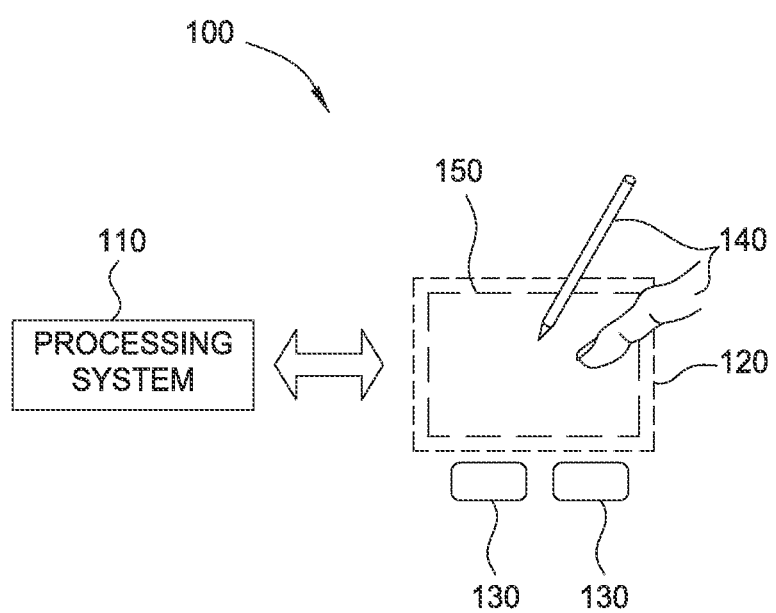
FIG. 1 is a block diagram of an exemplary input device, in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various examples of the present technology provide an input device configured to remove certain types of commonly-experienced interference. For example, many devices emit electromagnetic signals that may induce interference having a frequency spectrum that resembles a square wave or an impulse train. These types of interference may hinder the ability of the input device to detect information about an input object within a sensing region. A comb filter, configured in a specified manner, serves to reduce or eliminate much of the effects of these types of noise. More specifically, a comb filter applies "zeroes" to a signal at evenly-spaced intervals in the frequency domain. By aligning these zeroes with the harmonics of the noise described above, the noise is effectively canceled out. Further, choosing a sensing frequency that does not align with these zeroes, allows the comb filter to preserve the signal components associated with a sensing signal.

Turning now to the figures, FIG. 1 is a block diagram of an exemplary input device 100, in accordance with embodiments of the invention. In various embodiments, the input device 100 comprises a sensing device and optionally a display device. In other embodiments, the input device 100 comprises a display device having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns 150 of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
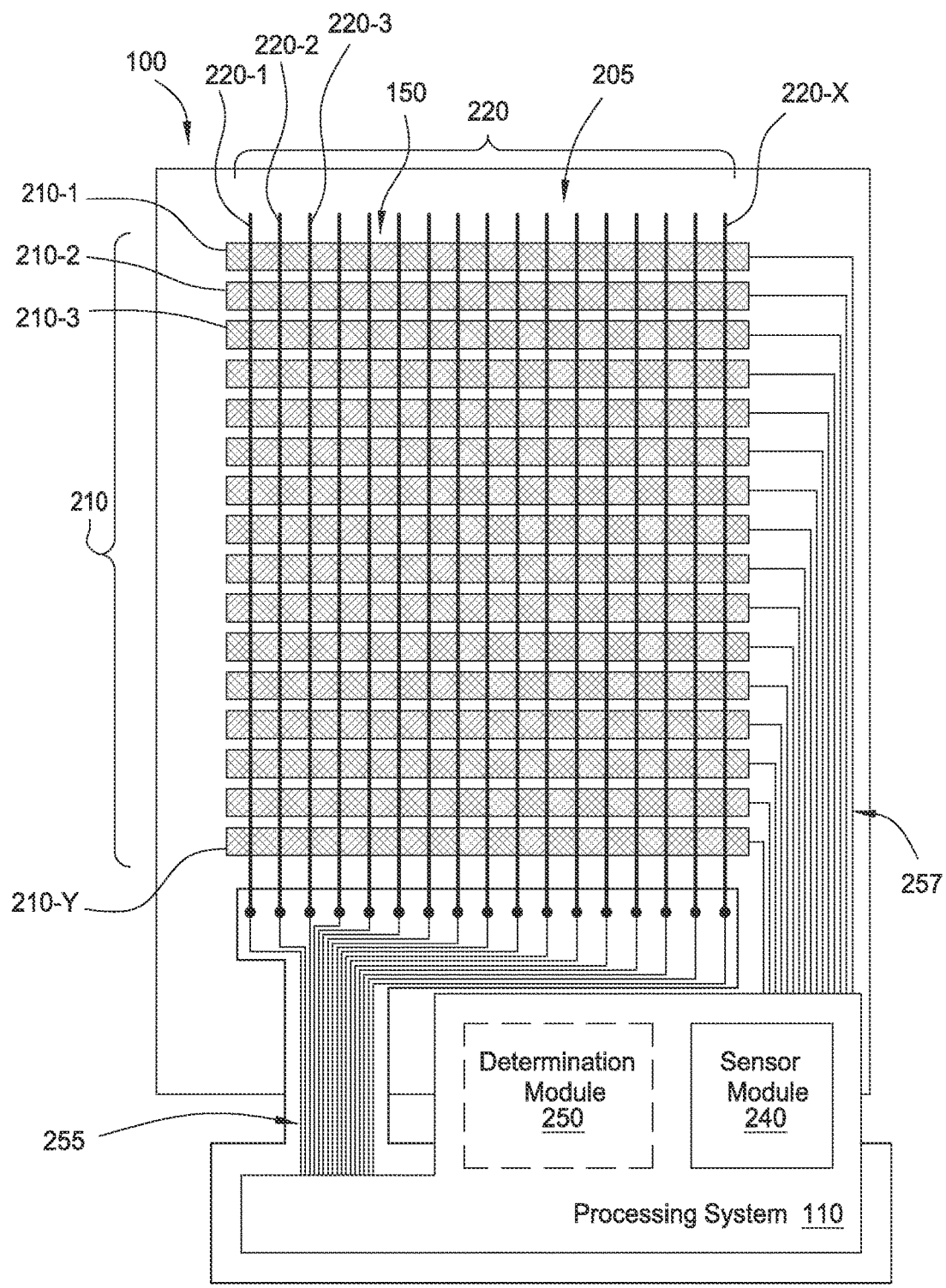
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and a processing system 110. In some embodiments, the circuitry that comprises the processing system 110 is embodied as a single integrated chip (IC) or as multiple IC's. While the processing system 110 illustrated in FIG. 2 includes one IC, the processing system 110 may be implemented with more ICs to control the various components in the input device. For example, the functions of the IC of the processing system 110 may be implemented in more than one integrated circuit that can drive transmitter signals and/or receive resulting signals received from the array of sensing elements 150. In embodiments where there is more than one IC of the processing system 110, communications between separate processing system 110 ICs may be achieved through a synchronization mechanism, which sequences the signals provided to the first electrodes 210 and/or the second electrodes 220. In some embodiments, the synchronization mechanism may be internal to any one of the ICs.

The array of sensing elements 150 includes a plurality of sensor electrodes 205, which includes a plurality of first electrodes 210 (e.g., 210-1, 210-2, 210-3, etc.) and a plurality of second electrodes 220 (e.g., 220-1, 220-2, 220-3, etc.). The first electrodes 210 and second electrodes 220 may be referred to herein collectively as "sensor electrodes." In some embodiments, the first electrodes 210 are perpendicular, or approximately perpendicular, to the second electrodes 220. Additionally, although the first electrodes 210 are illustrated in FIG. 2 as being wider than the second electrodes 220, in various embodiments, the width of the first electrodes 210 may be approximately equal to, or smaller than the width of the of the second electrodes 220.

First electrodes 210 and second electrodes 220 are ohmically isolated from each other by one or more insulators composed of electrically insulative material that separate the first electrodes 210 from the second electrodes 220 and prevent them from electrically shorting to each other. The electrically insulative material separates the first electrodes 210 and the second electrodes 220 at cross-over areas at which the electrodes intersect. In one configuration, the first electrodes 210 and/or second electrodes 220 are formed with jumpers connecting different portions of the same electrode. In other configurations, the first electrodes 210 and the second electrodes 220 are separated by one or more layers of electrically insulative material. In yet other configurations, at least some of the first electrodes 210 and second electrodes 220 may be disposed on a single layer, with no jumpers.

In some touch screen embodiments, the first electrodes 210 comprise one or more display electrodes (e.g., "V-com electrodes", gate electrodes, source electrodes, anode electrodes, and/or cathode electrodes) used in updating the display of a display screen. In other embodiments, the second electrodes 220 comprise one or more display electrodes used in updating the display of the display screen. In further embodiments, the first electrodes 210 and second electrodes 220 comprise one or more display electrodes used in updating the display of the display screen. Further, in various embodiments the first electrodes 210 and/or second electrodes 220 comprise the entire or substantially the entire Vcom electrode layer. These common electrodes may be disposed on an appropriate display screen substrate. For example, the display electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), a glass substrate of an organic light emitting diode (OLED), etc. In such embodiments, the display electrode can also be referred to as a "combination electrode," or "common electrode," since it performs multiple functions. In various embodiments, two or more first electrodes 210 or second electrodes 220 may share one or more combination electrodes.

The first electrodes 210 and/or second electrodes 220 may be formed as discrete geometric forms, polygons, bars, pads, lines or other shape, which are ohmically isolated from one another. The first electrodes 210 and/or second electrodes 220 may be electrically coupled through circuitry to form electrodes having larger plan area relative to a discrete one of the first electrodes 210 and/or second electrodes 220. The first electrodes 210 and/or second electrodes 220 may be fabricated from opaque or non-opaque conductive materials. In embodiments where the first electrodes 210 and/or second electrodes 220 are utilized with a display device, it may be desirable to utilize non-opaque conductive materials for the first electrodes 210 and/or second electrodes 220. In some embodiments where the first electrodes 210 and/or second electrodes 220 are utilized with a display device, it may be desirable to utilize opaque conductive materials for the first electrodes 210 and/or second electrodes 220. In various embodiments where the first electrodes 210 and/or second electrodes 220 are not utilized with a display device, it may be desirable to utilize opaque conductive materials having lower resistivity for the first electrodes 210 and/or second electrodes 220 to improve sensor performance. Materials suitable for fabricating the first electrodes 210 and/or second electrodes 220 include Indium Tin Oxide (ITO), aluminum, silver, copper, and conductive carbon materials, among others. The first electrodes 210 and/or second electrodes 220 may be formed as contiguous body of conductive material having little or no open area (i.e., having a planar surface uninterrupted by holes), or may alternatively be fabricated to form a body of material having openings formed therethrough. For example, the first electrodes 210 and/or second electrodes 220 may be formed a mesh of conductive material, such as a plurality of interconnected thin metal wires.

As stated above, the first electrodes 210 and second electrodes 220 may be referred to herein generically or collectively as sensor electrodes 205. For example, first electrodes 210 may be referred to herein as "first sensor electrodes," and second electrodes 220 may be referred to herein as "second sensor electrodes." Sensor electrodes 205 may also be used herein to refer to any combination of first electrodes 210 and/or second electrodes 220.

In one embodiment, the processing system 110 includes a sensor module 240. In other embodiments, the processing system 110 also includes a determination module 250, a display module, and a memory. The processing system 110 is coupled to the first electrodes 210 through a first plurality of conductive routing traces 255 and to the second electrodes 220 through a second plurality of conductive routing traces 257.

The sensor module 240 drives the array of sensing elements 150 for capacitive sensing to detect the presence and position of input objects 140 within sensing region 120. The processing system 110 determines position locations based on signals received by the sensor module 240. In embodiments that include a determination module 250, these determinations may be made by the determination module 250. In embodiments that include a display, processing system 110 drives display elements with signals to update a displayed image. In some embodiments, a display module included in the processing system 110 drives the display elements.

The sensor module 240 is able to drive the array of sensing elements 150 for capacitive sensing in two different modes: an absolute sensing mode, which is based on self-capacitance (also known as absolute capacitance), and a transcapacitive mode, which is based on transcapacitance (also known as a mutual capacitance).

In the absolute sensing mode, the sensor module 240 drives the first electrodes 210 and receives, with the first electrodes 210, first signals indicative of capacitive coupling between the first electrodes 210 and an input object 140 present in the sensing region 120, if any. The sensor module 240 may also drive the second electrodes 220 and receives, with the second electrodes 220, second signals indicative of capacitive coupling between the second electrodes 220 and an input object 140 present in the sensing region 120. The processing system 110 analyzes the first signals and second signals to determine the location of the input object 140. More specifically, the processing system 110 determines one or more locations within the sensing region 120 that are associated with at least one of the first signals and second signals that have an intensity that is greater than a threshold. Each first electrode 210 is associated with a particular vertical location within the sensing region 120. Similarly, each second electrode 220 is associated with a particular horizontal location within the sensing region 120. Thus, a location within the sensing region is generally associated with one or more first electrodes 210 that have similar vertical locations as the location and one or more second electrodes 220 that have similar horizontal locations as the location. The processing system 110 determines that an input object 140 is at a particular location if both the first signal for that location and the second signal for that location are above a threshold.

In the transcapacitive mode, the sensor module 240 drives the first electrodes 210 with transmitter signals and receives resulting signals with the second electrodes 220. Alternatively, the sensor module 240 may drive the second electrodes 220 with transmitter signals and receive resulting signals with the first electrodes 210. In either case, the electrode that is used to transmit may be referred to herein as a "transmitter electrode" or "transmitter sensor electrode," and the electrode that is used to receive may be referred to herein as a "receiver electrode" or "receiver sensor electrode." The resulting signals received are indicative of capacitive coupling between the first electrodes 210 and the second electrodes 220. The areas of localized capacitive coupling between transmitter electrodes and receiver electrodes may be termed "capacitive pixels." The capacitive coupling between the transmitter electrodes and receiver electrodes changes with the proximity and motion of input objects in the sensing region 120 associated with the transmitter electrodes and the receiver electrodes. The sensor module 240 may be configured to pass the resulting signals to a determination module 250 for determining the presence of an input object and/or to a memory for storage. In various embodiments, the IC of the processing system 110 may be coupled to drivers for driving the first electrodes 210 and/or second electrodes 220. The drivers may be fabricated using thin-film-transistors (TFT) and may comprise switches, combinatorial logic, multiplexers, and other selection and control logic.

Transmitter electrodes may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined. The transmitter electrodes may transmit transmitter signal bursts. Transmitter signal bursts may include multiple transmitter signal cycles (e.g., 20-40 bursts). The number of bursts in a particular transmitter signal is referred to herein as a burst count. Typically, two or more transmitter signal bursts may be transmitted for each row for each capacitive frame.

The receiver electrodes may be operated singly or multiply to acquire resulting signals. The resulting signals may be used to determine measurements of the capacitive couplings at the capacitive pixels.

In either the absolute capacitive mode and the transcapacitive mode, a set of measurements from the capacitive pixels form a "capacitive image" representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object in the sensing region 120. The background capacitance changes with the environment and operating conditions, and may be estimated in various ways. For example, some embodiments take "baseline images" when no input object 140 is determined to be in the sensing region 120, and use those baseline images as estimates of their background capacitances. That is, some embodiments compare the measurements forming a capacitance image with appropriate "baseline values" of a "baseline image" associated with those pixels, and determine changes from that baseline image.

In some situations, the baseline image may be "relaxed." Baseline relaxation refers to a transition from one baseline capacitive image to another baseline capacitive image. More specifically, the processing system 110 updates the baseline image based on recently-received measurements, to account for any changes in the baseline image that may have occurred since previously recording a baseline image. In some embodiments, the baseline image is relaxed periodically.

Although a particular pattern of sensing electrodes is illustrated in FIG. 2, various other sensing electrode patterns are compatible with the techniques described herein. In one example, the plurality of sensor electrodes includes a grid of "matrix" sensor electrodes that are each driven in sequence in absolute sensing mode. In another example, the matrix sensor electrodes may be driven in transcapacitive sensing mode. Signals received with each matrix sensor are indicative of capacitive coupling of that matrix sensor with an input object (or lack thereof). Further, the matrix sensors may be driven singly or in groups of two or more.

While driving the sensor electrodes for capacitive sensing, signals received by the sensor module may include effects associated with noise. FIGS. 3-9 illustrate techniques for reducing the effect of such noise.

Figure 3:
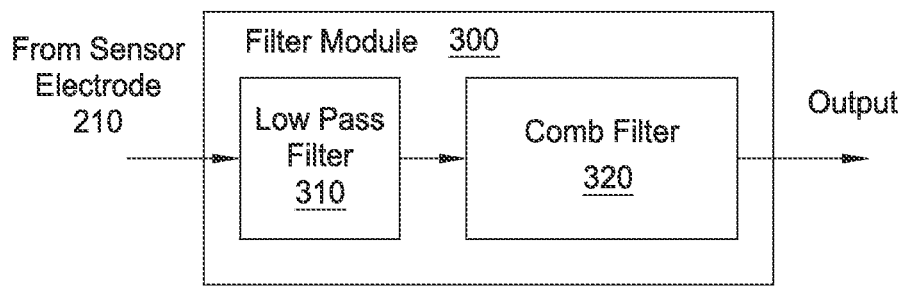
FIG. 3 illustrates a filter module, according to an example set forth herein.

FIG. 3 illustrates a filter module 300, according to an example set forth herein. As shown, the filter module 300 includes a low pass filter 310 and a comb filter 320. The filter module 300 may be included in the processing system 110 shown in FIGS. 1 and 2. The filter module 300 receives signals from sensor electrodes that are driven for capacitive sensing. The signals generally include effects related to the presence or absence of input objects 140 within the sensing region 120. The signals may also include effects related to noise, which is generally undesirable. Many common sources of noise generate noise signals that approximate an impulse train or square wave. In the frequency domain, these noise signals are characterized by having a series of impulses spaced apart at regular frequency intervals. Examples of such noise include noise from battery chargers for charging a mobile electronic device, such as a smart phone and electrical noise from displays.

To counteract this type of noise, the processing system 110 includes the filter module 300. The filter module 300 generally includes a low pass filter 310 and a comb filter 320, and may include other components, such as a front end unit, a decimator, a demodulator, and the like, as is generally described below with respect to FIGS. 5A-8.

The low pass filter 310 is generally configured to pass frequencies below a particular threshold frequency and to attenuate frequencies above that threshold frequency to a particular degree. In one example, the low pass filter passes frequencies at or below a threshold frequency. The threshold frequency may correspond to the rate at which measurement samples are taken. The low pass filter 310 provides a low pass filter output to the comb filter 320, where the low pass filter output corresponds to the signal received from the sensor electrodes 205 as modified by the low pass filter 310. In other embodiments, the low pass filter may instead be a bandpass filter operating at the sensing frequency.

The comb filter 320 receives the low pass filter output and applies comb filtering to the low pass filter output to generate a comb filter output. More specifically, the comb filter 320 adds a delayed version of the low pass filter output to the low pass filter output. This process substantially attenuates frequency components within the signal that have frequencies spaced apart at a regular interval. The frequencies at which the signal is substantially attenuated are termed "zeroes," as the attenuation applied by the comb filter 320 to an incoming signal generally brings the amplitude of the signal at that frequency component to approximately zero. The comb filter 320 is configured such that these zeroes are aligned with the fundamental frequency and harmonics of the noise signal described above, so that those frequency components are attenuated to near-zero amplitude, thus effectively canceling the noise.

FIGS. 4A-9 describe details for a filter module 300 for use where the signal from the sensor electrodes 205 applied to the comb filter 320 is sampled (i.e., a continuous signal is "sampled" to produce a succession of samples). Although not described in great detail herein, a comb filter 320 for continuous (i.e., unsampled) signals may also be used.

Figure 4A:
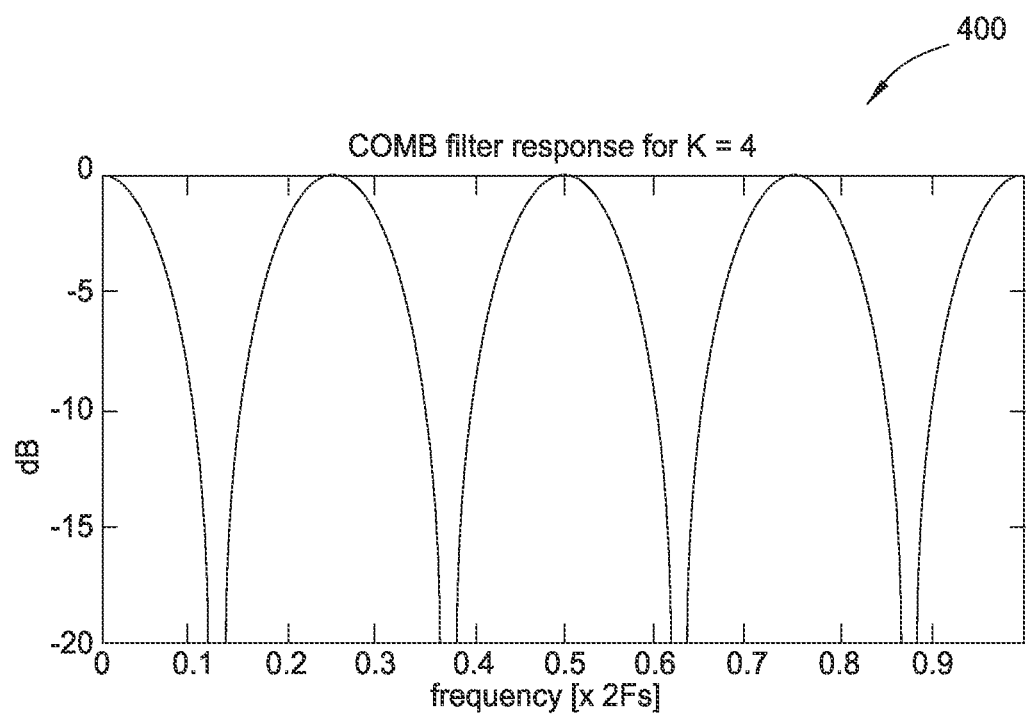
FIG. 4A is a graph illustrating the frequency response for a comb filter having four delay elements (K=4), according to one example described herein.

FIG. 4A is a graph 400 illustrating the frequency response for a comb filter having four delay elements (K=4), according to one example described herein. The sensing signal applied by sensor module 240 to the sensor electrodes has a particular frequency (a "sensing frequency"). That sensing signal is altered to some degree depending on the presence or absence, as well as location and other characteristics of an input object 140, thus resulting in a signal that is received with one or more sensing electrodes. In order for the zeroes of the comb filter 320 not to cancel components of the signal at or near the sensing frequency, the sensing frequency ("$F_S$") is set to a particular multiple of the fundamental frequency of the interference ("$F_C$"). In one example, $F_S$ is set equal to an even multiple of $F_C$ because one particular applied comb filter cancels out odd harmonics and not even harmonics.

In general, a comb filter 320 for processing sampled signals is characterized by a factor K, which describes the number of samples over which the delay of the added, delayed signal, that characterizes the comb filter, occurs. For instance, if K=4, then the comb filter 320 adds a signal that is delayed by four samples with the signal received by the comb filter 320 to produce an output signal. As described above, in many situations, the interference to be canceled by the comb filter 320 is similar to and can thus be approximated as a square wave. A square wave has a fundamental frequency $F_C$ and harmonics at $3F_C$, $5F_C$, $7F_C$, and so on. The comb filter 320 has nulls at odd multiples of $F_S/K$. The value K for the comb filter 320 is set to the ratio of $F_S/F_C$, which creates nulls at above-described frequencies corresponding to the fundamental frequency and harmonics for the square wave interference ($F_C$, $3F_C$, $5F_C$, and $7F_C$). As described above, these nulls "cancel" the frequency components of the square wave at these frequencies. Moreover, because the sensing signal has a frequency that is not aligned with the fundamental frequency or harmonics of the interference, the sensing signal is not canceled by the comb filter 320.

The graph 400 illustrates the frequency response for a comb filter 320 configured as described above. More specifically, the comb filter 320 associated with graph 400 is configured with K=4, so that nulls are produced at odd multiples of $F_S/K$. Because $K=F_S/F_C$, the nulls are produced at odd multiples of $F_C$, e.g., $1\times F_C$, $3F_C$, $5F_C$, and $7F_C$. The horizontal axis of the graph represents frequency, in multiples of twice the sensing frequency ($2F_S$). The vertical axis of the graph represents amplitude. Thus the point on the horizontal axis of the graph designated "0.5" is associated with $1\times F_S$, the point designated "1" is associated with $2\times F_S$, and so on. As shown, the graph 400 includes four zeroes spaced evenly from frequency 0 to $2F_S$, equivalent to $1\times F_C$, $3F_C$, $5F_C$, and $7F_C$.

Figure 4B:
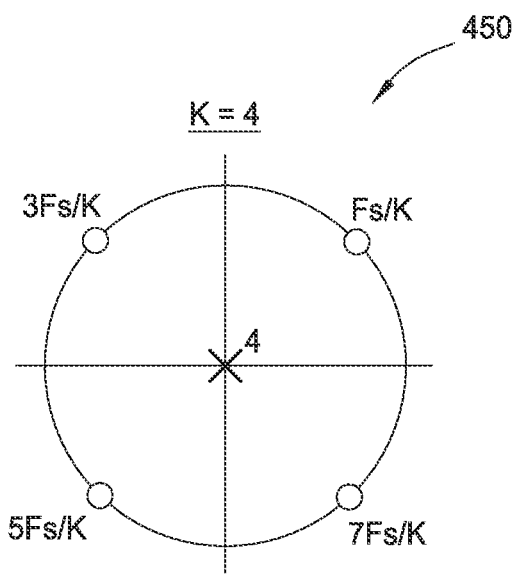
FIG. 4B illustrates a pole-zero plot of the comb filter, according to one example disclosed herein.

FIG. 4B illustrates a pole-zero plot 450 of the comb filter 320, according to one example disclosed herein. The pole-zero plot 450 illustrates the zeroes of the comb filter 320 configured as described above with respect to FIG. 4A. More specifically, the pole-zero plot 450 shows zeros for frequencies $F_S/K$, $3F_S/K$, $5F_S/K$, and $7F_S/K$, when K=4 as described above. When a comb filter 320 associated with the pole-zero plot 450 is applied to a signal received from a sensor electrode, the result will have zeros at the frequencies indicated in the pole-zero plot 450. Thus, a signal having interference at those frequencies will have that interference significantly reduced or canceled.

Figure 4C:
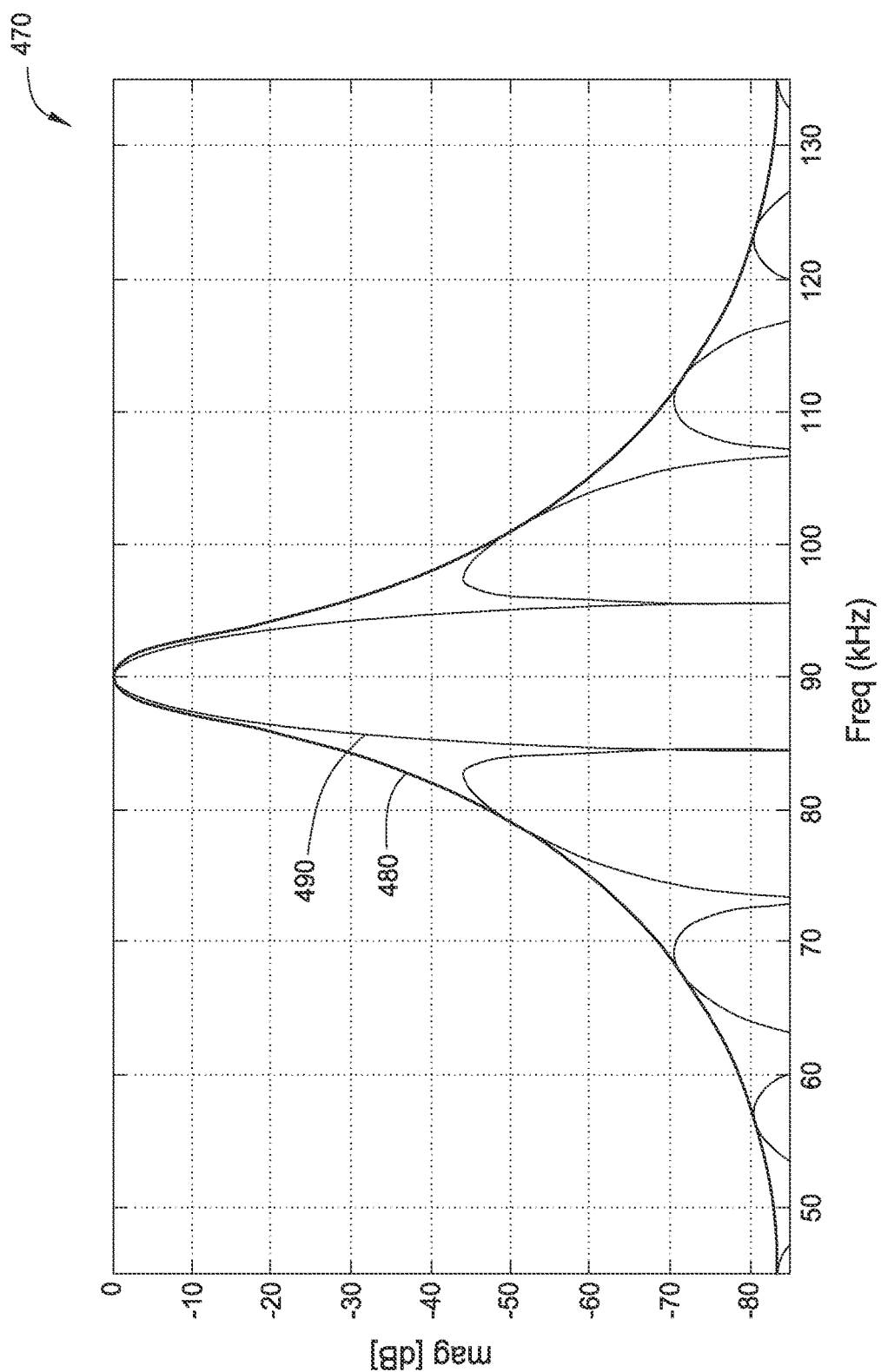
FIG. 4C illustrates a graph showing the results after a comb filter is applied to a signal received with a sensing electrode, according to one example disclosed herein.

FIG. 4C illustrates a graph 470 showing the results after a comb filter 320 is applied to a signal received with a sensing electrode, according to one example disclosed herein. As shown, the graph 470 includes a first plot 480 and a second plot 490, which are both plotted as frequency versus magnitude. The first plot 480 shows a signal received with a sensing electrode 205 as modified by a low pass filter 310 applied after demodulation of the sensing frequency (or by a bandpass filter applied before demodulation) having a cutoff threshold at or near a sensing frequency of 90 kHz. The second plot 490 shows the signal corresponding to the first plot 480 as modified by a comb filter 320 having K=8. As such a comb filter 320 would have eight zeroes, eight different minima are included in the second plot 490, spaced at regular intervals in terms of frequency. Further, the comb filter 320 is configured such that no minimum is applied to the sensing frequency of 90 kHz. However, in other embodiments, of sensing frequencies may also be used.

Figure 5A:
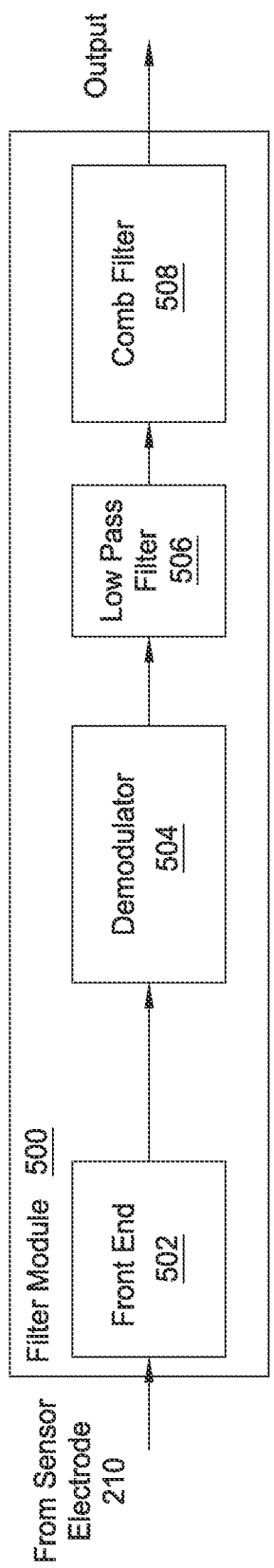
FIG. 5A illustrates an example of a filter module, including a front end and a demodulator, in addition to a low pass filter and comb filter, according to one example disclosed herein.

FIG. 5A illustrates an example of a filter module 500, including a front end 502 and a demodulator 504, in addition to a low pass filter 506 and comb filter 508. The filter module 500 is one example of the filter module 300 of FIG. 3. The front end 502 converts a current or charge received by the front end 502 into a voltage and effectively functions to sample the signal received by the front end 502. The demodulator 504 demodulates a received signal from the sensing frequency to a baseband or intermediate (IF) frequency. More specifically, the demodulator 504 removes the carrier signal—that is, the sensing signal applied to the sensor electrode 205—from the signal in order to isolate the effects related to capacitive sensing while enabling the low-pass filter 506 to eliminate interference sources away from the sensing frequency. The comb filter 508 applies comb filtering as generally described above in order to remove noise having a particular frequency pattern.

Figure 5C:
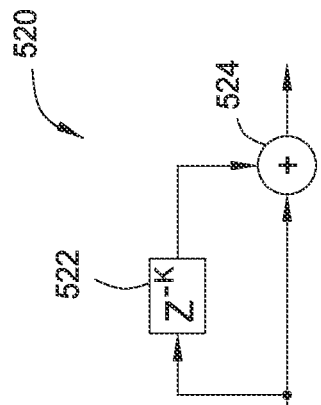
FIG. 5C illustrates one example of a comb filter to be included in the filter module, as the comb filter illustrated in FIG. 5A, according to one example disclosed herein.
Figure 5B:
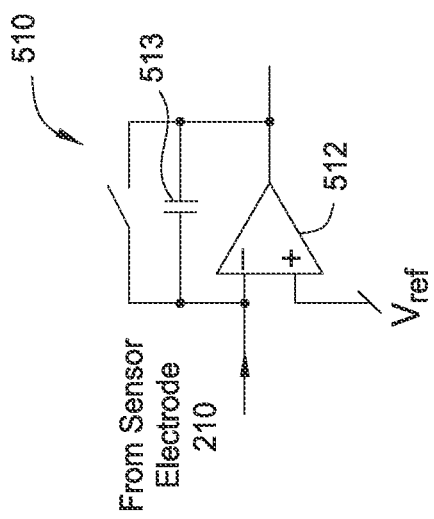
FIG. 5B illustrates one example of a front end to be included in the filter module of FIG. 5A, as the front end, according to one example disclosed herein.

FIG. 5B illustrates one example of a front end 510 to be included in filter module 500, as the front end 502, according to one example of the disclosure. The front end 510 includes an operational amplifier 512, with a capacitor 513 coupled between the output and inverting terminal of the operational amplifier 512. A switch is also coupled in parallel with the capacitor in order to periodically discharge the capacitor. The capacitor is charged based on the current or charge applied to the inverting terminal of the operational amplifier.

Where sensor module 240 performs absolute sensing, a driver unit coupled to the front end 502 may apply a signal to a sensor electrode. More specifically, a driver unit may include a signal generator coupled to the non-inverting input terminal of the operational amplifier 512 or a pre-charging driver connected directly to the receiver electrode. For transcapacitive sensing, a transmitter unit transmits signals onto a sensor electrode 210 and front end 510 receives resulting signals with a different sensor electrode 210.

FIG. 5C illustrates one example of a comb filter 520 to be included in the filter module 500, as the comb filter 508, according to one example of the disclosure. The comb filter 520 illustrated in FIG. 5C includes a delay element 522 that delays an incoming signal to generate a delayed signal and an adder 524 that adds the delayed signal to the incoming signal. The notation $z^{-K}$ indicates a delay of K discrete time units. It is also possible to apply a continuous time delay using an analog delay line. Together, these elements apply the comb filtering techniques described above to an incoming signal.

FIG. 5D illustrates a circuit-level example of a comb filter 530 for use in the filter module 500, as the comb filter 508, according to one example. Comb filter 530 is configured such that K=4 (i.e., comb filter 530 includes four delay elements). As shown, the comb filter 530 includes four capacitors 532 connected in parallel to an input line 533 providing an input signal. The comb filter 530 also includes a plurality of input switches 534 and output switches 536, each coupled to a respective capacitor 532.

The input switches 534 and output switches 536 are activated in a particular sequence in order to generate the delayed signal described above. Graph 538 illustrates the sequence in which the input switches 534 and output switches 536 are activated and deactivated. When a particular signal is low, the corresponding switch is deactivated and when a particular signal is high, the corresponding switch is activated. Each switch is activated or deactivated based on the graph that has the symbol displayed proximate that particular switch.

The sequence with which the input switches 534 and output switches 536 are activated and deactivated cause a value to be charged onto a particular capacitor 532 and then to be discharged via an output switch 536 a given amount of time later. For example, based on the graph associated with $\varphi_1$, first capacitor 532(1) is charged at a first time, via first input switch 534(1) and is then discharged four cycles later via first output switch 536(1). Thus, the value received by first capacitor 532(1) is provided to the output of the comb filter 530 in a delayed manner. Values stored by the other capacitors 532 are delayed in a similar manner. Because a capacitor exists for each of four time periods, a four-sample delay is created by comb filter 530, which corresponds to a K-value of 4.

Figure 5E:
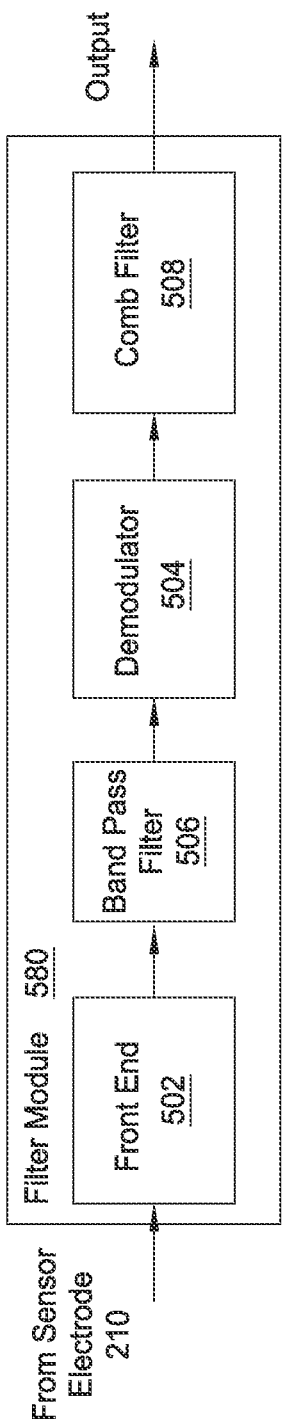
FIG. 5E illustrates another example of a filter module, with a demodulator located in between a low pass filter and a comb filter, according to one example disclosed herein.

FIG. 5E illustrates another example of a filter module 580, with a demodulator 504 located in between a band pass filter 506 and a comb filter 508, according to one example disclosed herein. Filter module 580 is similar to filter module 500 except that the location of the demodulator 504 is different. More specifically, instead of the demodulator 504 being in between the front end 502 and the low pass filter 506, as in FIG. 5A, the demodulator 504 is between the low pass filter 506 and the comb filter 508. In the case of a discrete-time, switched cap demodulator, it would be possible to combine the comb filter circuit as shown in FIG. 5D with the demodulator circuit shown FIG. 6B into a single circuit.

Figure 5F:
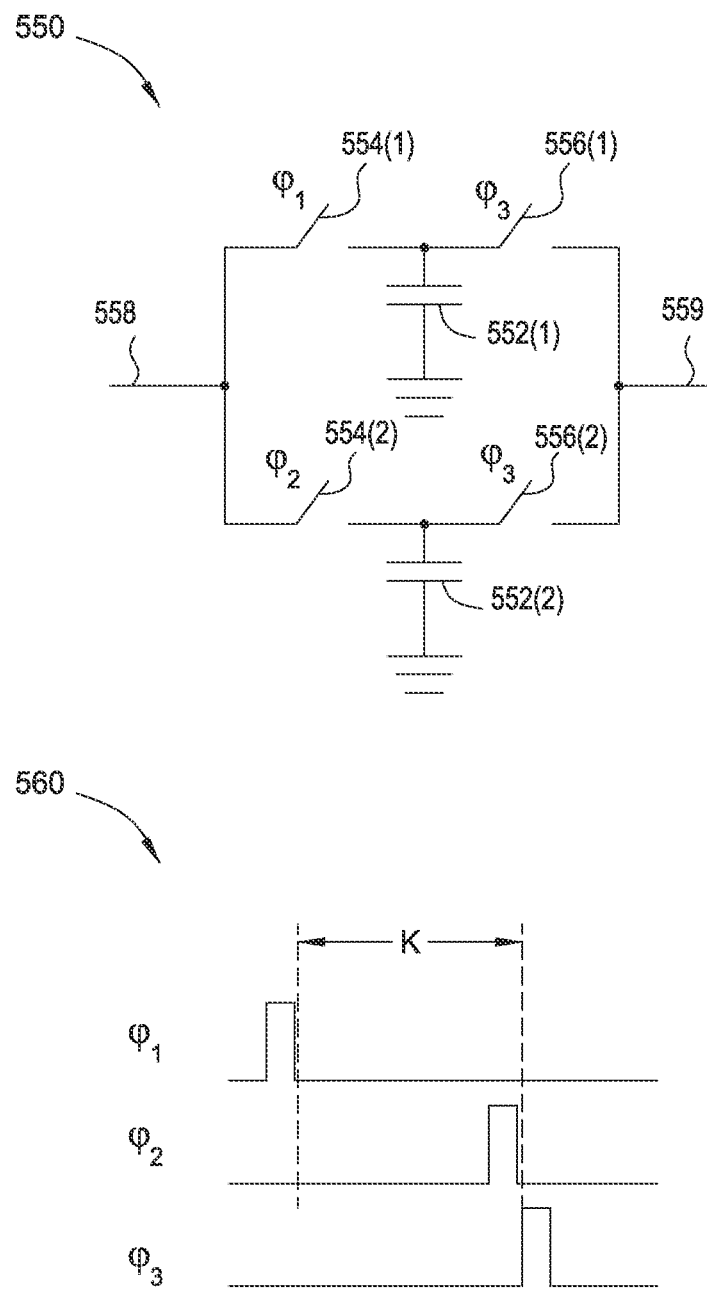
FIG. 5F illustrates another circuit-level example of a comb filter for use in the filter module of FIG. 5A, according to one example disclosed herein.

FIG. 5F illustrates another circuit-level example of a comb filter 550 for use in the filter module of FIG. 5A, according to one example disclosed herein. The comb filter 550 includes a first capacitor 552(1) and a second capacitor 552(2). A first input switch 554(1) and a second input switch 554(2) receive input from an input line 558 and provide output to first capacitor 552(1) and second capacitor 552(2), respectively. A first output switch 556(1) and a second output switch 556(2) receive input from the first capacitor 552(1) and second capacitor 552(2), respectively, and provide output to output line 559.

The graph 560 illustrates the sequence in which the input switches 554 and output switches 556 are opened and closed. More specifically, input switch 554(1) is activated K samples prior to input switch 554(2) being activated, meaning that capacitor 552(1) stores a value corresponding to a sample that is K samples prior to the sample stored by capacitor 552(2). Because output switch 556(1) and output switch 556(2) are activated at the same time, the values stored in capacitor 552(1) and capacitor 552(2) are added together onto output line 559.

Figure 6A:
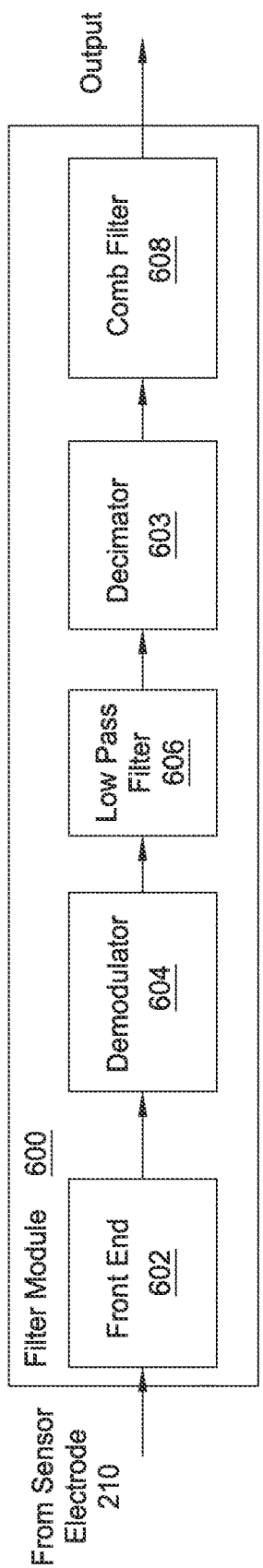
FIGS. 6A and 6B illustrate an example of a filter module that includes a decimator, in addition to the components included in the filter module of FIGS. 5A-5D, according to examples disclosed herein.
Figure 6B:
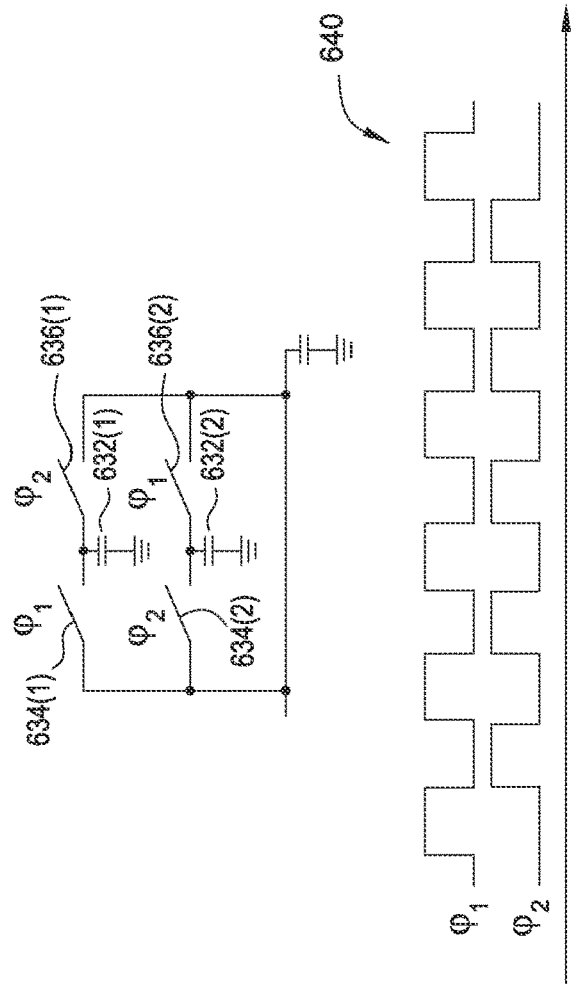

FIGS. 6A and 6B illustrate an example of a filter module 600 that includes a decimator 603, in addition to the components included in the filter module 500 of FIGS. 5A-5D (a front end 602, a demodulator 604, a low pass filter 606, and a comb filter 608). The front end 602, demodulator 604, low pass filter 606, and comb filter 608 may have some or all of the same components as the corresponding components illustrated in FIGS. 3 and 5A-5D and may have some or all of the same functionality as the corresponding components illustrated in FIGS. 3 and 5A-5D.

The decimator 603 is configured to reduce the number of samples in a signal by a certain factor. For example, a decimator 603 operating at a factor of 2 would remove half of the samples from a signal. As another example, a decimator 603 operating at a factor of 4 would remove three quarters of the samples from a signal.

Including the decimator 603 in the filter module 600 allows the number of capacitors in the comb filter 608 to be reduced with respect to a filter module that does not include decimator 603. The decimator 603 reduces by a factor of N the output sample rate compared to the input sample rate. More specifically, because the number of samples is reduced, the number of "taps" or capacitor charges that are required is reduced by the same factor N in order to achieve the same delay time. This reduction in number of capacitors allows for the construction of simpler circuitry. Placing the decimator after the low-pass filter allows for the largest sample rate reduction factor, but the decimator can be placed earlier in the chain. There can also be multiple decimators. For example, there may be a decimate-by-2 after the demodulator 604 and a further decimate-by-N after the low-pass filter 606.

FIG. 6B illustrates the comb filter 608 of FIG. 6A, configured to operate in conjunction with a factor-2 decimator (a decimator that reduces the number of samples by half). The comb filter 608 includes two capacitors 632 coupled to input switches 634 and output switches 636. Each input switch 634 and output switch 636 is triggered based on a corresponding activation graph, illustrated in graph 640. As is depicted, the switches labeled with $\varphi_1$ are activated on alternating samples as the switches labeled with $\varphi_2$. Thus, the top capacitor 632 is charged with a value on a first cycle while the bottom capacitor 632 is discharged, and the bottom capacitor 632 is charged with a value while the top capacitor 632 is discharged. This alternating scheme introduces a delay of two samples into the signal processed by the comb filter 608.

Figure 7:
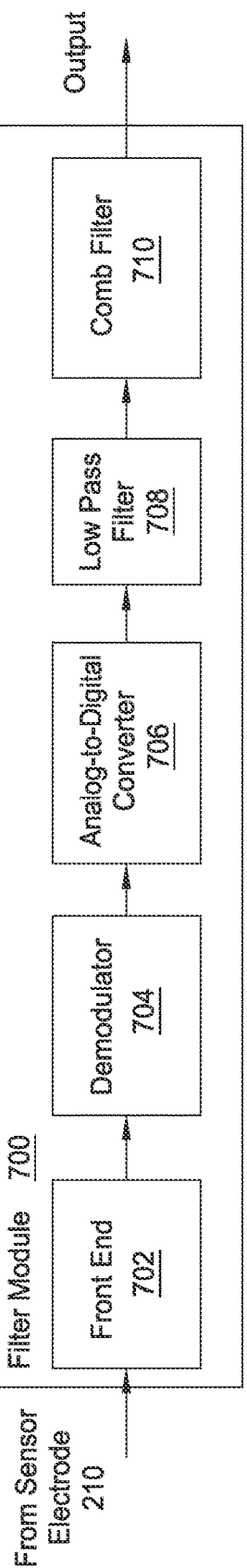
FIG. 7 illustrates an example filter module that includes a digital comb filter, according to one example disclosed herein.

FIG. 7 illustrates an example filter module 700 that includes a digital (as opposed to analog) comb filter 710. The digital comb filter 710 may be implemented as software or firmware executing on a processor included within or not within processing system 110, or by other hardware configured to apply a comb filter to a signal as generally discussed above. The front end 702 and demodulator 704 may be the same front end and demodulator as discussed above with respect to FIGS. 5A and 6A. The analog-to-digital converter (ADC) 706 receives samples from the demodulator 704 and converts the samples to digital values. In one embodiment, the low pass filter 708 is a digital low pass filter than operates in a similar manner as described above with respect to FIG. 5A, except on digital values as opposed to analog values. In an alternative embodiment the low-pass filter 708 precedes the ADC 706. In yet another embodiment there is an analog low-pass filter both preceding the ADC 706 and a digital low-pass filter after the ADC 706.

Referring to FIG. 4B, the zeros of the comb filter are located on the unit circle in the Z-domain. As a result the notches in the frequency response (shown in FIG. 4A) are deep but narrow. An advantage of a digital implementation of the comb filter is that it is relatively straightforward to move the zeros away from the unit circle. Moving the zeros away from the unit circle results in the frequency response notches being less deep but broader. The notches being less deep but broader allows for better filtering in situations where the frequency of the interference harmonics are not accurately known or vary in time.

Figure 8:
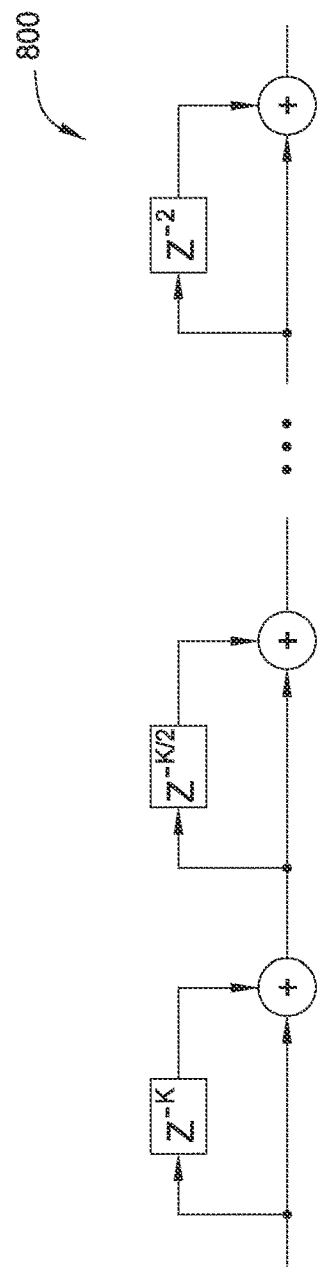
FIG. 8 illustrates an example comb filter group that includes a cascade of comb filters, according to one example disclosed herein.

FIG. 8 illustrates an example comb filter group 800 that includes a cascade of comb filters 802. The comb filter group 800 may be included in the filter modules 500, 600, or 700 in order to cancel noise having harmonics with a different configuration than the harmonics of a square wave. In one example, an impulse train may have harmonics at integer multiples (as opposed to only odd multiples) of a harmonic frequency, such as $2F_C$, $3F_C$, $4F_C$, $5F_C$, and so on. As discussed above, a comb filter where $K=F_S/F_C$ has nulls at odd multiples of $F_C$. In order to cover both odd and even multiples of $F_C$, comb filters 802 may be cascaded as shown in FIG. 8. More specifically, a number of comb filters equal to $\log_2 K$ are provided in the comb filter group 800. The first comb filter 802 has a delay of K, the last comb filter 802 has a delay of 2, and each other comb filter 802 has a delay that is half of the delay of the preceding comb filter 802.

The first comb filter 802 in this comb filter group 800 provides zeroes for odd multiples of $F_C$. Each subsequent comb filter 802 provides zeroes for some group of even multiples of $F_C$. Cascading the comb filters 802 results in each comb filter 802 applying the respective zeroes of that comb filter 802 to the received signal, which causes the signal output from the last comb filter 802 to have zeroes corresponding to the union of the zeroes of each of the comb filter 802 in the comb filter group 800.

As stated above, each comb filter 802 after the first comb filter has zeroes for some even multiple of $F_C$. For example, a comb filter 802 with delay K/2 (where, as stated above, $K=F_S/F_C$) would have zeros at $2F_C$, $6F_C$, $10F_C$, and so on. A comb filter 802 with delay K/4 would have zeros at $4F_C$, $12F_C$, and so on. For K=8, cascading comb filters with delay equal to 8, 4, and 2 would produce zeros at $F_C$, $2F_C$, $3F_C$, $4F_C$, $5F_C$, $6F_C$, $7F_C$, $9F_C$, $10F_C$, $11F_C$, $12F_C$, and so on. Because $F_S/F_C=K=8$, the cascade does not zero frequencies at $8F_C$. Thus, cascading comb filters 802 in this manner produces a comb filter group 800 that cancels odd and even harmonics, and that leaves the sensing frequency substantially unattenuated.

Figure 9:
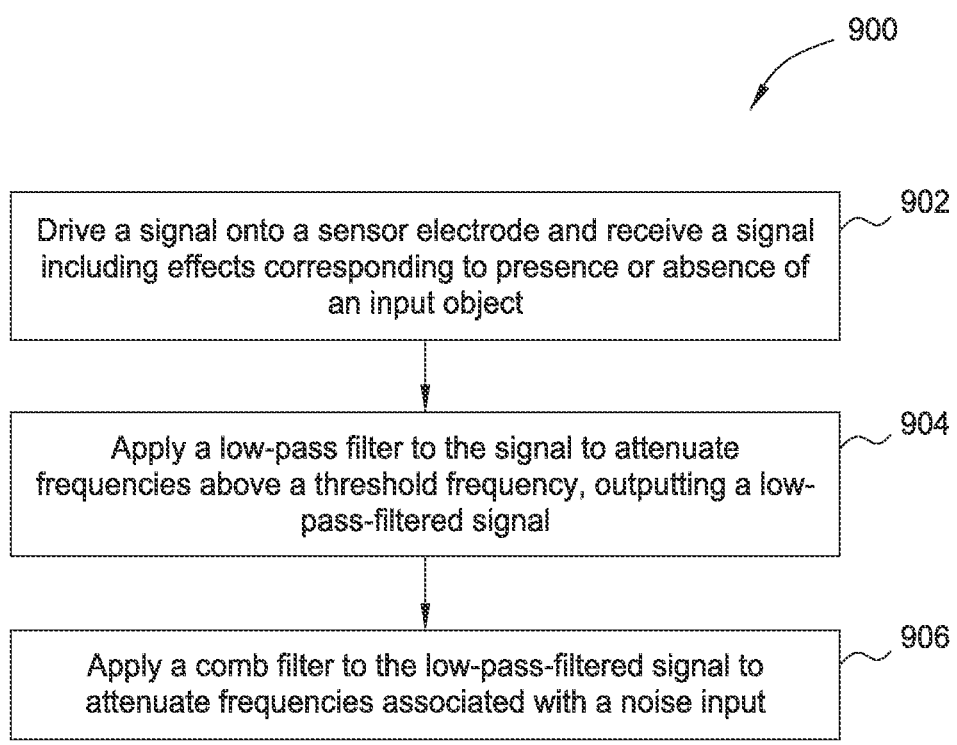
FIG. 9 is a flow diagram of method steps for applying filtering to a signal having noise components, according to an example disclosed herein.

FIG. 9 is a flow diagram of method steps for applying filtering to a signal having noise components, according to an example disclosed herein. Although the method steps are described in conjunction with the systems of FIGS. 1-8, persons skilled in the art will understand that any system configured to perform the method steps, in various alternative orders, falls within the scope of the present invention.

As shown, a method 900 begins at step 902, where a sensor module 240 drives a signal onto a sensor electrode and receives a signal in return. The received signal includes effects corresponding to presence or absence of an input object within sensing region 120. In step 904, the sensor module 240 applies low-pass filtering to the received signal in order to attenuate frequencies above a threshold frequency. In step 906, the sensor module 240 applies comb filtering to the signal received from the low-pass filter in order to attenuate frequencies associated with a noise input, such as input received from a device charging apparatus.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A processing system for a capacitive sensing device comprising:
   a transmitter configured to drive a sensor electrode with an absolute sensing signal;
   a receiver configured to receive a signal resulting from the absolute sensing signal being driven on the sensor electrode, and to output a first intermediate signal based on the resulting signal;
   a first filter configured to attenuate a frequency of the first intermediate signal, and to output a second intermediate signal based on the attenuated first intermediate signal and
   a plurality of cascaded comb filters configured to remove interference at even or odd harmonics of a frequency of interference in the second intermediate signal to generate an output signal indicating a presence of an input object, wherein the plurality of cascaded comb filters is to remove the interference by:
   adding at least one signal that is delayed by a number of samples with respect to the second intermediate signal, wherein the number of samples is based on a ratio of a sensing frequency of the absolute sensing signal and the attenuated frequency of the first intermediate signal that is different for each of the plurality of cascaded comb filters.

2. The processing system of claim 1, wherein the first filter comprises a low-pass filter.

3. The processing system of claim 1, wherein at least one comb filter of the plurality of cascaded comb filters comprises zeros that are moved away from a unit circle of a pole-zero plot corresponding to the at least one comb filter.

4. The processing system of claim 1, wherein the plurality of cascaded comb filters is configured to:
   remove interference that comprises a fundamental frequency and two or more uniformly spaced harmonic frequencies.

5. The processing system of claim 1, wherein the transmitter is configured to drive a transmitter electrode with a transmitter signal.

6. The processing system of claim 1, wherein the processing system further comprises:
   a demodulator coupled to the first filter and to the plurality of cascaded comb filters and configured to demodulate the second intermediate signal.

7. The processing system of claim 1, wherein the processing system further comprises:
   a demodulator coupled to the plurality of cascaded comb filters and configured to demodulate the output signal.

8. The processing system of claim 1, wherein the processing system further comprises:
   a decimator coupled to the first filter and configured to reduce a sampling rate of a received signal.

9. The processing system of claim 1, wherein at least one of the plurality of cascaded comb filters is configured to add a delay of four samples.

10. The processing system of claim 9, wherein at least one of the plurality of cascaded comb filters is configured to operate in conjunction with a decimator.

11. The processing system of claim 10, wherein:
   at least one of the plurality of cascaded comb filter removes at least interference at even harmonic frequencies of a fundamental frequency of the interference, and
   at least one of the plurality of cascaded comb filter removes at least interference at odd harmonic frequencies of the fundamental frequency of the interference.

12. A sensor module comprising:
a receiver configured to receive a signal resulting from an absolute sensing signal being driven on a sensor electrode, and to output a first intermediate signal based on the resulting signal;
a first filter configured to attenuate a frequency of the first intermediate signal and to attenuate a frequency of the first intermediate signal, and to output a second intermediate signal based on the attenuated first intermediate signal; and
a plurality of cascaded comb filters configured to remove interference at even or odd harmonics of a frequency of interference in the second intermediate signal to generate an output signal indicating a presence of an input object, wherein the plurality of cascaded comb filters is to remove the interference by:
adding at least one signal that is delayed by a number of samples with respect to the second intermediate signal, wherein the number of samples is based on a ratio of a sensing frequency of the absolute sensing signal and the attenuated frequency of the first intermediate signal that is different for each of the plurality of cascaded comb filters.

13. The sensor module of claim 12, wherein two or more of the plurality of cascaded comb filters are configured to remove interference that comprises a fundamental frequency and two or more evenly spaced harmonic frequencies.

14. The sensor module of claim 12, further comprising:
a transmitter coupled to a transmitter electrode and configured to drive the transmitter electrode with a transmitter signal.

15. The sensor module of claim 12, further comprising:
a driver unit configured to drive the sensor electrode with an absolute sensing signal.

16. The sensor module of claim 12, further comprising:
a decimator coupled to the first filter and to at least one of the plurality of cascaded comb filters and configured to decimate the second intermediate signal.

17. An input device comprising:
a plurality of sensor electrodes configured for capacitive sensing;
a processing system coupled to the plurality of sensor electrodes and configured to:
receive a touch sensor signal from a sensor electrode, the touch sensor signal comprising first signal components of a first frequency and interference comprising even harmonics or odd harmonics of a second frequency;
filter the touch sensor signal to attenuate one or more frequencies of the touch sensor signal and generate an intermediate signal based on the touch sensor signal; and
filter the intermediate signal using a plurality of cascaded comb filters configured to remove interference at even harmonics or odd harmonics of a frequency of interference in the intermediate signal to generate an output signal indicating a presence of an input object, wherein the plurality of cascaded comb filters is to remove the interference by:
adding at least one signal that is delayed by a number of samples with respect to the intermediate signal, wherein the number of samples is based on a ratio of a sensing frequency of the absolute sensing signal and the attenuated frequency of the intermediate signal that is different for each of the plurality of cascaded comb filters.

18. The input device of claim 17, further comprising a power supply.

19. A method for a capacitive sensing device comprising:
driving a sensor electrode with an absolute sensing signal;
receiving a touch sensor signal from a sensor electrode, the touch sensor signal comprising first signal components of a first frequency and interference comprising even harmonics or odd harmonics of a second frequency;
outputting a first intermediate signal based on the touch sensor signal;
filtering the first intermediate signal using a first filter to attenuate a frequency of the first intermediate signal and to produce a second intermediate signal based on the attenuated first intermediate signal; and
filtering the second intermediate signal, using a plurality of cascaded comb filters configured to remove interference in the second intermediate signal to generate an output signal indicating a presence of an input object, wherein the plurality of comb filters is to remove interference by:
adding at least one signal that is delayed by a number of samples with respect to the second intermediate signal, wherein the number of samples is based on a ratio of a sensing frequency of the absolute sensing signal and the attenuated frequency of the first intermediate signal that is different for each of the plurality of cascaded comb filters.

* * * * *